United States Patent
Hayashi et al.

(10) Patent No.: US 9,695,291 B2
(45) Date of Patent: Jul. 4, 2017

(54) POROUS POLYTETRAFLUOROETHYLENE FILM AND METHOD FOR PRODUCING SAME

(71) Applicant: SUMITOMO ELECTRIC FINE POLYMER, INC., Sennan-gun, Osaka (JP)

(72) Inventors: Fumihiro Hayashi, Osaka (JP); Aya Murata, Osaka (JP); Hiroyuki Tsujiwaki, Osaka (JP); Atsushi Uno, Osaka (JP)

(73) Assignee: SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 0 days.

(21) Appl. No.: 14/758,641

(22) PCT Filed: Jun. 23, 2014

(86) PCT No.: PCT/JP2014/066555
§ 371 (c)(1),
(2) Date: Jun. 30, 2015

(87) PCT Pub. No.: WO2015/002001
PCT Pub. Date: Jan. 8, 2015

(65) Prior Publication Data
US 2015/0337098 A1    Nov. 26, 2015

(30) Foreign Application Priority Data
Jul. 1, 2013 (JP) .................. 2013-138037

(51) Int. Cl.
| | |
|---|---|
| *B01D 69/02* | (2006.01) |
| *B01D 71/06* | (2006.01) |
| *B29C 55/12* | (2006.01) |
| *B01D 67/00* | (2006.01) |
| *C08J 5/18* | (2006.01) |
| *B29C 67/20* | (2006.01) |
| *B01D 71/32* | (2006.01) |
| *B01D 71/36* | (2006.01) |
| *B29C 55/00* | (2006.01) |
| *B29K 27/18* | (2006.01) |
| *B29L 7/00* | (2006.01) |
| *B29K 105/04* | (2006.01) |

(52) U.S. Cl.
CPC ............ *C08J 5/18* (2013.01); *B01D 67/0027* (2013.01); *B01D 67/0083* (2013.01); *B01D 69/02* (2013.01); *B01D 71/32* (2013.01); *B01D 71/36* (2013.01); *B29C 55/005* (2013.01); *B29C 55/12* (2013.01); *B29C 67/20* (2013.01); *B01D 2323/08* (2013.01); *B01D 2325/02* (2013.01); *B29K 2027/18* (2013.01); *B29K 2105/04* (2013.01); *B29L 2007/008* (2013.01); *C08J 2327/18* (2013.01)

(58) Field of Classification Search
None
See application file for complete search history.

(56) References Cited

U.S. PATENT DOCUMENTS

| | | | | |
|---|---|---|---|---|
| 5,071,609 A | * | 12/1991 | Tu ...................... | B29C 55/005 264/119 |
| 5,102,921 A | * | 4/1992 | Harada ................ | B29C 55/005 264/127 |
| 5,510,176 A | * | 4/1996 | Nakamura ........... | B01D 71/36 428/316.6 |
| 5,910,277 A | | 6/1999 | Ishino et al. | |
| 2011/0052900 A1 | | 3/2011 | Uno et al. | |

FOREIGN PATENT DOCUMENTS

| | | |
|---|---|---|
| CN | 1102748 A | 5/1995 |
| CN | 101580598 A | 11/2009 |
| CN | 103100310 A | 5/2013 |
| EP | 0418155 A2 | 3/1991 |
| EP | 0525630 A2 | 2/1993 |
| JP | H03-174452 A | 7/1991 |
| JP | H03-221541 A | 9/1991 |
| JP | 2010-094579 A | 4/2010 |
| JP | 2011-052175 A | 3/2011 |
| JP | 2012-045524 A | 3/2012 |
| WO | WO 2008/018400 A1 | 2/2008 |
| WO | WO-2010/092938 A1 | 8/2010 |

OTHER PUBLICATIONS

U.S. Appl. No. 14/758,625, filed Jun. 30, 2015, Hayashi, et al.
Choi, K., et al., "Structure Development in Multistage Stretching of PTFE Films," from Journal of Polymer Science: Part B: Polymer Physics, vol. 48, pp. 2248-2256 (2010), Wiley Periodicals, Inc.
The Extended European Search Report issued Jan. 18, 2017 in European Patent Application No. 14819487.1.

\* cited by examiner

*Primary Examiner* — Kara Boyle
(74) *Attorney, Agent, or Firm* — Drinker Biddle & Reath LLP

(57) ABSTRACT

A porous polytetrafluoroethylene film comprising a fluororesin containing polytetrafluoroethylene as a main component, wherein an envelope surface area of resin fibers included per film having an area of 1 $m^2$ and a thickness of 25 μm is 4,000 $m^2$ or more, and a melting point peak is 333° C. or lower.

4 Claims, No Drawings

POROUS POLYTETRAFLUOROETHYLENE FILM AND METHOD FOR PRODUCING SAME

TECHNICAL FIELD

The present invention relates to a porous polytetrafluoroethylene (PTFE) film comprising a fluororesin containing polytetrafluoroethylene as a main component and used as, for example, a filter for filtration of liquids (separation membrane), and a method for producing the porous polytetrafluoroethylene film.

BACKGROUND ART

It is desirable that filters for removing fine impurity particles from liquids have, for example, a uniform and fine pore size in order to reliably separate fine particles by filtration, and a high porosity in order to obtain a high filtration flow rate (good filtration treatment efficiency). Furthermore, good chemical resistance, good heat resistance, good mechanical strength, etc. are often desired.

Porous films comprising a fluororesin containing PTFE as a main component (porous PTFE films) are used as such filters because they have good chemical resistance, good heat resistance, good mechanical strength, etc. and a porous structure having a uniform and fine pore size can be easily obtained.

Porous PTFE films can be produced by stretching a sheet obtained by molding a high-molecular-weight PTFE powder to make a porous sheet. For example, PTL 1 (paragraphs 0026 to 0038) discloses a method for producing a porous stretched PTFE sheet (porous PTFE film), the method including the steps of 1) molding a kneaded product of a high-molecular-weight PTFE unsintered powder and a liquid lubricant into a sheet by paste extrusion, 2) stretching the sheet to prepare a porous film, and 3) sintering the stretched porous film (in order to prevent the film from shrinking after the stretching).

CITATION LIST

Patent Literature

PTL 1: International Publication No. 2010/092938

SUMMARY OF INVENTION

Technical Problem

In recent years, not only an improvement in a trapping ratio for fine particles but also a higher porosity has been desired for filters used in, for example, the production of electronic elements of semiconductor circuits and the like. Specifically, with the miniaturization of semiconductor circuits, it has been desirable to provide filters capable of removing, from pure water and liquid chemicals used in the production of electronic elements, fine particles that affect the production at a higher trapping ratio. In addition, in order to improve a filtration flow rate and realize high productivity, a higher porosity has also been desired. Furthermore, strong acids and strong alkalis may be used as liquid chemicals used in the production of elements, and filtration of pure water and liquid chemicals is often conducted at a high temperature of about 80° C. Accordingly, high chemical resistance (chemical stability) and high heat resistance have also been desired.

The porosity of porous PTFE films necessary for achieving a high filtration flow rate can be adjusted by controlling a stretching ratio in a stretching step. However, when the stretching ratio is increased, the pore size also increases, resulting in a problem in that a filter having a fine pore size for trapping fine particles is not obtained.

Accordingly, there is provided a porous film comprising a fluororesin containing, as a main component, PTFE having good chemical resistance (chemical stability) and good heat resistance, the porous PTFE film having a high retention ratio for fine particles and a high porosity and thus being capable of meeting such requirements in recent years. Also provided is a method for producing a porous PTFE film, the method being capable of producing such a porous PTFE film.

Solution to Problem

A first embodiment of the present invention is a porous PTFE film comprising a fluororesin containing PTFE as a main component, in which an envelope surface area of resin fibers included per film having an area of 1 $m^2$ and a thickness of 25 μm is 4,000 $m^2$ or more, and a melting point peak is 333° C. or lower.

A second embodiment of the present invention is a method for producing a porous PTFE film, the method including a step (stretching step) of stretching a sheet-like molded body comprising a fluororesin containing PTFE as a main component in a longitudinal direction and a transversal direction at a temperature lower than a melting point of the fluororesin to make a porous sheet; and a step (sintering step) of sintering the porous sheet until a melting point peak of the fluororesin becomes 333° C. or lower by maintaining the porous sheet at a temperature higher than the melting point of the fluororesin for 20 seconds or less.

Advantageous Effects of Invention

The porous PTFE film according to the first embodiment of the present invention has good chemical resistance (chemical stability) and good heat resistance. When the porous PTFE film is used as a filter for filtration of a liquid, fine particles in the liquid can be removed with a high retention ratio. Furthermore, since the porous PTFE film has a high porosity, a high filtration efficiency (high treatment flow rate) can be obtained. Therefore, the porous PTFE film is suitable for use in, for example, filtration of pure water and liquid chemicals used in the production of electronic elements.

The porous PTFE film according to the first embodiment having the above good characteristics can be produced by the method for producing a porous PTFE film according to the second embodiment of the present invention.

DESCRIPTION OF EMBODIMENTS

Next, embodiments for carrying out the present invention will be described specifically. It is to be understood that the present invention is not limited to the embodiments and Examples, and can be changed to other embodiments as long as the object of the present invention is not impaired.

As a result of intensive studies, the inventors of the present invention found that a porous PTFE film having a high porosity that has not hitherto been obtained and a high retention ratio for fine particles can be obtained by stretching a sheet comprising a fluororesin containing PTFE as a main component in a longitudinal direction and a transversal direction to make a porous sheet, and then sintering the porous sheet by heating the porous sheet at a high temperature exceeding a melting point of PTFE for a short time.

A first embodiment of the present invention is a porous polytetrafluoroethylene film comprising a fluororesin containing PTFE as a main component, in which an envelope surface area of resin fibers (fluororesin fibers) included per film having an area of 1 m² and a thickness of 25 μm is 4,000 m² or more, and a melting point peak is 333° C. or lower. The term "melting point peak" refers to a temperature of an endothermic peak due to melting of the fluororesin in a differential scanning calorimetry (DSC) curve when DSC of the fluororesin is performed.

The term "envelope surface area of resin fibers" refers to the total of surface areas of fibers of PTFE included per porous PTFE film having an area of 1 m² and a thickness of 25 μm, and the envelope surface area of resin fibers is hereinafter referred to as "envelope surface area ratio". The envelope surface area ratio is specifically a value measured by the method described below.

[Method for Measuring Envelope Surface Area Ratio]

First, a specific surface area (m²/g) of a porous PTFE film is determined with a pore distribution measuring instrument (Perm Porometer CFP-1500A: manufactured by Porous Materials, Inc.). A value calculated on the basis of the following formula from the determined specific surface area, a mass per unit area of the film (referred to as "basis weight"), and a film thickness is defined as the envelope surface area ratio.

Envelope surface area ratio=specific surface area (m²/g)×basis weight (g/m²)×1 (m²)×25 (μm)/ film thickness (μm)

As described above, regarding existing porous PTFE films, in the case where the films have a large porosity, the pore size increases and the retention ratio for fine particles decreases. However, when the envelope surface area of fibers of a resin constituting a porous body is increased (that is, when the envelope surface area ratio is large), even in the case of the same porosity, a higher retention ratio can be obtained. The porous PTFE film of the first embodiment has a large envelope surface area ratio, namely, 4,000 m² or more. Accordingly, even in the case where the porosity is large, the porous PTFE film can collect fine particles at a high retention ratio. The envelope surface area ratio is preferably 4,500 m² or more and more preferably 8,000 m² or more.

Regarding a porous PTFE film having an envelope surface area ratio of 4,000 m² or more, even in the case where the porosity is 70% or more, a retention ratio for particles having a particle size of 50% of a mean flow pore size can be 20% or more. Accordingly, a preferred embodiment of the present invention is the porous PTFE film according to the first embodiment, in which a porosity is 70% or more, and a retention ratio for particles having a particle size of 50% of a mean flow pore size is 20% or more.

Herein, the term "retention ratio" for particles refers to a ratio of fine particles removed by a filter, the fine particles having a particular particle size. Specifically, a liquid (test liquid) containing fine particles having a particular particle size is filtered with a filter, and the amount of fine particles contained in a liquid after the filtration (filtrate) is measured. In this case, a ratio of fine particles reduced by the filtration is determined, and defined as the retention ratio in the particular particle size (more specifically, the retention ratio is measured by the method described in Examples below). The smaller the size of particles, the more the amount of fine particles removed by filtration decreases and thus the lower the retention ratio for particles becomes. However, the porous PTFE film of the preferred embodiment has a high retention ratio of 20% or more even in the case where fine particles having a particle size of 50% of a mean flow pore size of the film are filtered.

Herein, the mean flow pore size is a value measured by the method described below, and is an index representing a pore size of a film.

[Method for Measuring Mean Flow Pore Size]

The mean flow pore size was measured with a pore distribution measuring instrument (Perm Porometer CFP-1500A: manufactured by Porous Materials, Inc.) using GALWICK (manufactured by Porous Materials, Inc.) as a liquid. Specifically, the mean flow pore size is determined as follows. First, a relationship between a differential pressure applied to a film and a flow rate of air permeating through the film is determined by a measurement in the case where the film is dry and the case where the film is wet with a liquid. The obtained two graphs are referred to as a dry curve and a wet curve, respectively. A differential pressure at an intersection of the wet curve and a curve drawn by halving the flow rate in the dry curve is denoted by P (Pa). The mean flow pore size is determined by the following formula:

Mean flow pore size $d$ (μm)=$c\gamma/P$ where c is a constant of 2,860 and γ represents a surface tension (dynes/cm) of the liquid.

The porous PTFE film of the above preferred embodiment has a porosity of 70% or more. Accordingly, when this porous PTFE film is used as a filter, a high filtration treatment flow rate can be obtained.

In general, the larger a porosity, the more easily fine particles pass through pores of a filter. Thus, the retention ratio tends to decrease. However, the porous PTFE film of the above preferred embodiment can have a high retention ratio of 20% or more even in the case where fine particles having a particle size of 50% of the mean flow pore size are filtered, while having a high porosity of 70% or more.

The phrase "contains PTFE as a main component" means that "usually contains PTFE in an amount of 50% by mass or more but may contain other resins as long as the object of the present invention is not impaired". In particular, a fluororesin containing PTFE in an amount of 80% by mass or more is preferable because good characteristics of PTFE, such as chemical resistance and heat resistance, become more significant. Accordingly, a preferred embodiment of the present invention is the porous PTFE film of the first embodiment, in which the fluororesin containing PTFE as a main component contains PTFE in an amount of 80% by mass or more.

It is necessary to remove, from pure water and liquid chemicals used in the production of electronic elements, fine particles that adversely affect the production. With the recent miniaturization of semiconductor circuits, it has been desirable to remove fine particles having a particle size of less than 0.1 μm. As a filter for satisfying this requirement in recent years, a porous PTFE film having a mean flow pore size of 100 nm (0.1 μm) or less has been desired. Accordingly, a preferred embodiment of the present invention is the porous PTFE film of the first embodiment, in which a mean flow pore size is 100 nm or less. This porous PTFE film of the preferred embodiment has a mean flow pore size of 100 nm (0.1 μm) or less and thus satisfies the requirement in recent years.

Furthermore, regarding the porous PTFE film in which the porosity is 70% or more, and the retention ratio for particles having a particle size of 50% of the mean flow pore size (that is, particles having a particle size of 50 nm in the case where the mean flow pore size is 100 nm) is 20% or more, the porous PTFE film has a porosity of 70% or more, exhibits a high filtration treatment performance, and has a high retention ratio for fine particles, while having a mean flow pore size of 100 nm or less. Therefore, this porous PTFE film can be used as a filter that sufficiently satisfies the requirement in recent years.

The porous PTFE film of the first embodiment can be produced by stretching a molded PTFE film in a longitudinal direction and a transversal direction at a temperature lower than a melting point of the fluororesin to make a porous PTFE film, and then sintering the porous PTFE film until a melting point peak of the fluororesin becomes 333° C. or lower by maintaining the porous PTFE film at a temperature higher than the melting point of the fluororesin for 20 seconds or less.

Accordingly, the present invention provides, as a second embodiment thereof, a method for producing a porous PTFE film, the method including a step of stretching a sheet-like molded body comprising a fluororesin containing PTFE as a main component in a longitudinal direction and a transversal direction at a temperature lower than a melting point of the fluororesin to make a porous sheet (stretching step); and a step of sintering the porous sheet until a melting point peak of the fluororesin becomes 333° C. or lower by maintaining the porous sheet at a temperature higher than the melting point of the fluororesin for 20 seconds or less (sintering step).

In this production method, the porous sheet is sintered until a melting point peak of the fluororesin becomes 333° C. or lower by maintaining the porous sheet at a temperature higher than the melting point of the fluororesin for 20 seconds or less. Fluororesins before sintering usually show a melting point peak higher the melting point (literature data). For example, even in the case where a fluororesin before sintering is composed of only PTFE, the fluororesin often shows a melting point peak of at least 345° C., which is higher than 327° C., i.e., the melting point (literature data). This melting point peak is lowered by sintering. In this production method, sintering is performed until the melting point peak becomes 333° C. or lower.

The sintering time, that is, the time during which the fluororesin is maintained at a temperature higher than the melting point of the fluororesin is 20 seconds or less. The temperature of sintering is higher than the melting point of the fluororesin. Furthermore, the peak (maximum temperature) of the heating temperature (sintering temperature) and the thermal history of heating are selected such that the melting point peak is decreased to 333° C. or lower by heating for 20 seconds or less. In the case where the fluororesin is composed of only PTFE, the peak of the sintering temperature is usually 345° C. or higher and preferably 420° C. or higher.

As a result of this sintering, a porous PTFE film having an envelope surface area ratio of 4,000 $m^2$ or more is obtained. When the sintering temperature is low or when the sintering time is short, the melting point peak may not become 333° C. or lower. In such a case, a porous PTFE film having an envelope surface area ratio of 4,000 $m^2$ or more is not obtained. Furthermore, when the sintering time exceeds 20 seconds, a porous PTFE film having an envelope surface area ratio of 4,000 $m^2$ or more is not obtained. When the sintering time exceeds 20 seconds, breakage or shrinking of the film may occur.

The envelope surface area ratio can be further increased by further increasing the peak of the sintering temperature and further decreasing the sintering time. However, when a peak (maximum temperature) of the temperature (atmosphere temperature) in a sintering oven for heating a porous PTFE film exceeds 850° C., the effect of thermal decomposition increases, which is not preferable. A sintering time of less than 3 seconds is also not preferable because it becomes difficult to sinter a sheet until the melting point peak becomes 333° C. or lower and the sheet often remains unsintered. Preferable is a case where the peak of the atmosphere temperature is a temperature 60° C. to 450° C. higher than the melting point of the fluororesin, and the sintering time is 3 to 10 seconds. When the sintering is performed in these ranges, a porous PTFE film having an envelope surface area ratio of 4,500 $m^2$ or more can be obtained.

The sintering can be performed by maintaining the whole of the sheet that has become porous in the stretching step at the sintering temperature for 20 seconds or less, and then cooling the sheet so that the temperature of the whole sheet becomes lower than the melting point of the fluororesin.

Near-infrared rays transmit PTFE and PTFE absorbs only far-infrared rays having a wavelength of 5 µm or more. Accordingly, an example of the method for uniformly heating the whole of the porous sheet to a temperature higher than the melting point of the fluororesin within a short time and cooling the sheet within a short time is a method including irradiating the porous PTFE film with far-infrared rays at substantially the same intensity over the entire surface of the film. Alternatively, by transferring a long sheet using a roller, the sheet may be first passed through a preheating section so as to be preheated to a temperature lower than the melting point of the fluororesin, then passed through an atmosphere of 400° C. to 800° C. so as to be immediately heated to a temperature necessary for sintering, and then cooled. In the cooling, the whole sheet is preferably cooled to a temperature at least 50° C. lower than the melting point of the fluororesin within two seconds.

The sheet-like molded body comprising a fluororesin containing PTFE as a main component can be obtained by, for example, the method described in PTL 1. Specifically, the molded body can be obtained by kneading an unsintered powder of a fluororesin containing PTFE as a main component and a liquid lubricant, and molding the resulting kneaded product into a sheet by paste extrusion.

The unsintered fluororesin powder that can be used in this method is preferably an unsintered powder of a fluororesin containing, as a main component, a high-molecular-weight PTFE having a number-average molecular weight of 4,000,000 or more, and more preferably an unsintered powder of a fluororesin containing, as a main component, a high-molecular-weight PTFE having a number-average molecular weight of Ser. No. 12/000,000 or more.

Examples of the liquid lubricant include petroleum-based solvents such as solvent naphtha and white oil; hydrocarbon oils such as undecane; aromatic hydrocarbons such as toluol and xylol; alcohols; ketones; esters; silicone oils; fluorochlorocarbon oils; solutions obtained by dissolving a polymer such as polyisobutylene or polyisoprene in any of these solvents; mixtures of two or more of these; and water or aqueous solutions containing a surfactant.

The liquid lubricant is usually mixed in a ratio of 10 to 40 parts by mass, preferably 16 to 25 parts by mass relative to 100 parts by mass of the unsintered powder of a fluororesin containing PTFE as a main component. After the mixing, extrusion molding (paste extrusion) is performed.

The molding by paste extrusion is preferably performed at lower than 100° C. and is usually performed at about 50° C. Prior to the paste extrusion, preforming is preferably performed. In the preforming, for example, the above mixture is compression-molded at a pressure of about 1 to 10 MPa into a block, a rod, a tube, or a sheet.

The resulting preform obtained by the preforming is extruded with a paste extruder into a sheet. The preform can be molded into a sheet by conducting paste extrusion using a T-die. Furthermore, rolling with a calender roll or the like and drying may be conducted.

The liquid lubricant is preferably removed from the sheet-like molded body before the stretching step. The liquid lubricant can be removed by heating, extraction, dissolution, or the like.

Subsequently, the sheet-like molded body comprising a fluororesin containing PTFE as a main component, the sheet-like molded body being obtained as described above, is stretched (biaxially stretched) in a longitudinal direction and a transversal direction (direction perpendicular to the longitudinal direction) at a temperature lower than a melting point of the fluororesin (327° C. in the case of a film composed of only PTFE) to make a porous sheet.

The degree of stretching is preferably selected such that the porosity exceeds 70%. Specifically, by controlling the stretching ratio in the longitudinal direction to 2 to 10 times, more preferably 3 to 8 times and controlling the stretching ratio in the transversal direction to 2 to 20 times, more preferably 5 to 10 times, a porosity exceeding 70% can be obtained without causing breakage of the film or the like.

The sheet-like molded body of a fluororesin may be made porous by stretching (uniaxially stretching) the molded body in a longitudinal direction or a transversal direction at a temperature lower than a melting point of the fluororesin (327° C. in the case of a film composed of only PTFE).

The stretching in the longitudinal direction and the transversal direction can be performed by the same method and under the same conditions as those of biaxial stretching conducted in the production of existing porous PTFE films. The stretching can be performed by using a common machine, for example, a roll stretching machine, a tenter stretching machine, or a blow stretching machine. The temperature of the film during the stretching is a temperature lower than a melting point of the fluororesin (327° C. in the case of a film composed of only PTFE). The temperature of the film during the stretching is preferably a temperature 10° C. to 300° C. lower than the melting point of the fluororesin. The stretching is more preferably performed in the range of 29° C. to 250° C., and still more preferably in the range of 50° C. to 180° C.

The thickness of the porous PTFE film according to an embodiment of the present invention obtained as described above is not particularly limited. In the case where the porous PTFE film is used as a filter, a high treatment flow rate is desired. The treatment flow rate decreases when the film thickness is large. Thus, a porous PTFE film having a thickness of 200 m or less is usually used.

When the film thickness is small, the mechanical strength decreases. Accordingly, in order to maintain the mechanical strength, the porous PTFE film according to an embodiment of the present invention may be supported on a porous support that does not inhibit filtration performance of a filter, and used. For example, as described in PTL 1, another porous PTFE film having a larger mean pore size may be used as the support.

EXAMPLES

First, methods of measurement performed in Examples and Comparative Examples below will be described.

[Method for Measuring Mean Flow Pore Size]

A mean flow pore size was measured by the method described above with a pore distribution measuring instrument (Perm Porometer CFP-1500A: manufactured by Porous Materials, Inc.) using GALWICK (manufactured by Porous Materials, Inc.) as a liquid.

[Method for Measuring Mean Flow Pore Size]

A mean flow pore size was measured by the method described above with a pore distribution measuring instrument (Perm Porometer CFP-1500A: manufactured by Porous Materials, Inc.) using GALWICK (propylene, 1,1,2,3,3,3-oxidized hexahydrofluoric acid (manufactured by Porous Materials, Inc.)) as a liquid.

[Method for Measuring IPA Bubbling Point]

A PTFE porous body was impregnated with isopropyl alcohol, and pores in a tube wall were filled with isopropyl alcohol. Subsequently, an air pressure was gradually loaded from one surface. In this case, a pressure at which an air bubble exits from the opposite surface for the first time was defined as an IPA bubbling point.

[Method for Measuring Retention Ratio]

A latex of spherical polystyrene particles (manufactured by Bangs Laboratories, Inc.) having an outer diameter of about ½ of the mean flow pore size was diluted 50-fold with a 0.1% aqueous solution of polyoxyethylene(10) octylphenyl ether. The resulting solution was used as a test liquid. A prepared sample was punched into a disk having a diameter φ of 47 mm, and impregnated with isopropanol. Subsequently, the disk sample was fixed to a filtration holder (effective area: 9.61 cm$^2$), and 5 ml of the test liquid was filtered with a differential pressure of 0.42 kgf/cm$^2$. Standard particle concentrations of the test liquid and the resulting filtrate were each measured from an absorbance at 300 nm with a spectrophotometer (manufactured by Shimadzu Corporation, UV-160). A retention ratio was determined from the measured values of the standard particle concentrations by the following formula.

$$\text{Retention ratio} = \{1-(\text{standard particle concentration of filtrate})/(\text{standard particle concentration of test liquid})\} \times 100 [\%]$$

[Method for Measuring Envelope Surface Area Ratio of Resin Fibers]

An envelope surface area ratio of resin fibers is a value measured by the method described above.

[Measurement of Melting Point Peak by DSC (Determination Whether a Sample was Sintered or Unsintered)]

Differential scanning calorimetry (DSC) was performed with a DSC-50 (differential scanning calorimeter) manufactured by Shimadzu Corporation. Whether a sample was sintered or unsintered was determined on the basis of the measurement results. In the DSC measurement at a temperature-increasing rate of 10° C./min, when a melting point peak was 333° C. or lower, the sample was determined to be completely sintered. When a melting point peak was present at 340° C. or higher, the sample was determined to be unsintered.

Example 1

[Preparation of PTFE Sheet-Like Molded Body]

One hundred parts by mass of a PTFE unsintered powder (manufactured by Asahi Glass Co., Ltd.: CD123) was mixed with 16 parts by mass of solvent naphtha (liquid lubricant). The resulting mixture was compression-molded with a compression molding machine to obtain a columnar preform (preforming). This preform was extrusion-molded into a sheet using a T-die at a temperature of 50° C. and at a rate of 20 mm/min. The resulting sheet-like molded body was further rolled with a calender roll to obtain a sheet-like molded body having a thickness of 300 μm. Subsequently, the sheet-like molded body was passed through a heating roller at a roller temperature of 200° C. to remove the liquid lubricant.

[Stretching Step]

Four-fold stretching was performed at 200° C. in a longitudinal direction with a roll stretching machine. Subsequently, 10-fold stretching was performed at 130° C. in a transversal direction (direction perpendicular to the longitudinal direction) with a clip tenter stretching machine.

[Sintering Step]

Ceramic heaters (manufactured by NGK Insulators, Ltd.: INFRACERAM) were arranged in a paving stone manner on a ceiling and a bottom of a chamber that had been subjected to a thermal insulation treatment. The distance between a surface of the heater on the ceiling and a surface of the heater on the bottom was 100 mm. The PTFE sheet-like molded body stretched in the stretching step was fixed to a stainless steel frame. The PTFE sheet-like molded body with the frame was placed in the chamber in which the temperature on the surfaces of the heaters on the ceiling and the bottom was 800° C. and the atmosphere temperature was 500° C. for 10 seconds. The PTFE sheet-like molded body with the frame was then immediately taken out from the chamber and placed into an atmosphere at room temperature. A DSC measurement of the PTFE sheet-like molded body after being taken out from the chamber and placed into the atmosphere at room temperature was conducted. A single peak at 329° C. was observed, and thus the molded body was determined to be completely sintered.

The porous PTFE film obtained as described above had a thickness of 25 μm and an envelope surface area ratio of resin fibers of 4,600 m². The porosity was 80%, the mean flow pore size was 65 nm, and the retention ratio for particles (product number: DS02R) having a particle size of 30 nm was 25%.

Example 2

A porous PTFE film was prepared as in Example 1 except that the temperature on the surfaces of the heaters was 650° C., the atmosphere temperature was 420° C., and the time during which the PTFE sheet-like molded body was placed in the chamber was 20 seconds. The porous PTFE film had a thickness of 25 μm and an envelope surface area ratio of resin fibers of 4,300 m². The porosity was 80%, the mean flow pore size was 74 nm, and the retention ratio for particles (product number: DS02R) having a particle size of 30 nm was 18%.

Comparative Example 1

A porous PTFE film was prepared as in Example 1 except that the temperature on the surfaces of the heaters was 420° C., the atmosphere temperature was 380° C., and the time during which the PTFE sheet-like molded body was placed in the chamber was 20 seconds. A DSC measurement of the PTFE sheet-like molded body after being taken out from the chamber and placed into the atmosphere at room temperature was conducted. A melting point peak at 343° C. was observed, and a shoulder was detected at about 338° C. Thus, the molded body was determined to be unsintered. In the heating at a temperature on the surfaces of the heaters of 420° C. and at an atmosphere temperature of 380° C., even when the temperatures were maintained for 20 seconds, the melting point peak could not be decreased to 333° C. or lower. This result shows that heating at a higher temperature is necessary.

Comparative Example 2

A porous PTFE film was prepared as in Example 2 except that the time during which the PTFE sheet-like molded body was placed in the chamber was 30 seconds. Breakage that was believed to be caused by thermal decomposition and large pores due to thermal shrinkage were generated in the resulting PTFE sheet.

Comparative Example 3

A porous PTFE film was prepared as in Comparative Example 1 except that the time during which the PTFE sheet-like molded body was placed in the chamber was 30 seconds. A DSC measurement of the PTFE sheet-like molded body after being taken out from the chamber and placed into the atmosphere at room temperature was conducted. A single peak at 330° C. was observed, and thus the molded body was determined to be sintered. The prepared film had a thickness of 15 μM, a porosity of 65%, a mean flow pore size of 95 nm, and an envelope surface area ratio of resin fibers of 2,500 m². The retention ratio for particles (product number: DS03R) having a particle size of 50 nm was 6%.

The invention claimed is:

1. A porous polytetrafluoroethylene film comprising fluororesin fibers containing polytetrafluoroethylene as a main component, said film produced by:
   molding polytetrafluoroethylene unsintered powder into a sheet-like molded body by paste extrusion at a temperature lower than 100° C.;
   rolling the sheet-like molded body with a calender roll;
   after calender rolling, stretching the sheet-like molded body at a temperature lower than the melting point of the fluororesin to produce a porous sheet; and
   sintering the porous sheet by maintaining the porous sheet at a temperature higher than the melting point of the fluororesin for 20 seconds or less to produce the porous polytetrafluoroethylene film,
   the porous polytetrafluoroethylene film having an envelope surface area of resin fibers included per film having an area of 1 m² and a thickness of 25 μm of 4,000 m² or more, a porosity of 70% or more, and a retention ratio for particles having a particle size of 50% of a mean flow pore size of 20% or more, a mean flow pore size of 65 nm or more and a melting point peak of 333° C. or lower.

2. The porous polytetrafluoroethylene film according to claim 1,
   wherein the envelope surface area of resin fibers included per film having an area of 1 m² and a thickness of 25 μm is 4,500 m² or more.

3. The porous polytetrafluoroethylene film according to claim 1,
   wherein the fluororesin containing polytetrafluoroethylene as a main component contains polytetrafluoroethylene in an amount of 80% by mass or more.

4. The porous polytetrafluoroethylene film according to claim 1,
   wherein a mean flow pore size is 100 nm or less.

* * * * *